United States Patent [19]
Easton

[11] Patent Number: 4,491,436
[45] Date of Patent: Jan. 1, 1985

[54] PIVOT PIN ASSEMBLY

[75] Inventor: David J. Easton, Cedar Falls, Iowa

[73] Assignee: Deere & Company, Moline, Ill.

[21] Appl. No.: 477,117

[22] Filed: Mar. 21, 1983

[51] Int. Cl.³ ............................................. F16C 11/12
[52] U.S. Cl. .................... 403/122; 414/722;
    16/228; 403/131; 403/146; 403/154; 403/162
[58] Field of Search ............. 414/722, 723; 403/158,
    403/157, 156, 154, 162, 146, 131, 122, 161;
    16/228, 340, 386, 381

[56] References Cited

U.S. PATENT DOCUMENTS

| | | | |
|---|---|---|---|
| 256,293 | 4/1882 | Cooper | 16/386 |
| 531,884 | 1/1895 | Watrous | 16/340 |
| 1,817,438 | 8/1931 | Henry et al. | 16/381 X |
| 2,613,091 | 10/1952 | Funnell | 403/158 |
| 2,838,331 | 6/1958 | Coleman | 403/146 |
| 3,135,402 | 6/1964 | McCanse | 214/140 |
| 3,525,448 | 8/1970 | Bauer | 214/778 |
| 3,537,735 | 11/1970 | Hawk | 287/20.3 |
| 3,600,015 | 8/1971 | McMullen | 287/100 |
| 3,862,769 | 1/1975 | Bechman et al. | 403/146 X |
| 3,964,152 | 6/1976 | Shankwitz et al. | 29/427 |
| 4,004,855 | 1/1977 | Stecklein | 403/158 |
| 4,022,536 | 5/1977 | Piepho et al. | 403/16 |
| 4,096,957 | 6/1978 | Iverson et al. | 414/723 X |
| 4,188,146 | 2/1980 | Stecklein | 403/158 |
| 4,190,378 | 2/1980 | Stecklein | 403/146 |
| 4,192,622 | 3/1980 | Stecklein | 403/146 |
| 4,203,684 | 5/1980 | Stecklein | 403/158 |
| 4,243,192 | 6/1981 | Johnson | 403/158 X |
| 4,243,341 | 6/1981 | Kabay et al. | 403/158 X |
| 4,251,182 | 2/1981 | Schroeder | 414/723 |
| 4,291,614 | 9/1981 | Mölle et al. | 403/158 X |
| 4,398,862 | 8/1983 | Schroeder | 403/154 X |

FOREIGN PATENT DOCUMENTS

| | | | |
|---|---|---|---|
| 851655 | 10/1939 | France | 16/340 |
| 334271 | 1/1936 | Italy | 16/340 |

Primary Examiner—Cornelius J. Husar
Assistant Examiner—Joseph A. Fischetti

[57] ABSTRACT

A pivot pin assembly is disclosed which eliminates the need for a high pre-load torque to be applied in order to fix a friction-reducing element relative to the pivot pin. The pivot pin assembly includes a pivot pin having a shoulder formed on a central cylindrical portion thereof which is received in the bores of a forked member and in the bore of an intermediate member located therebetween. The pivot pin, has a conical surface at one end and is held fast in the bore of the other forked member by a collet which also has a tapered surface. The tapered surfaces of both the pin and the collet are mateable with the surfaces of the bores in the forked members as the collet is physically bolted to the pivot pin. A friction reducing element, having an inner and an outer race, is positioned about the central portion of the pivot pin such that the outer race is press-fitted into the bore of the intermediate member while the inner race is slidably received on the pivot pin and abuts against the aforementioned shoulder. An axial force is applied to the inner race by a compression spring which is positioned about the periphery of the pivot pin between the collet and the friction reducing element. The spring takes up slack between the collet and the pivot pin shoulder such that the conical surfaces can tightly interact. The spring also permits the friction reducing element to be held fixed relative to the pivot pin without requiring a high pre-load torque to be applied to the attaching bolt.

18 Claims, 2 Drawing Figures

4,491,436

PIVOT PIN ASSEMBLY

FIELD OF THE INVENTION

This invention relates to a pivot pin assembly which reduces the high pre-load torque necessary to retain a friction-reducing element relative to the pivot pin.

BACKGROUND OF THE INVENTION

Pivot pins are normally used to connect two members together such that one member will pivot relative to the other. In many off-road type vehicles, pivot pins are used between a fork member and the rod extending out of a hydraulic cylinder. Various types of pivot pin constructions are available on the market today. In some of these designs, a wear surface occurs on the periphery of the pin which necessitates complete replacement of the pivot pin after a certain time period. In other designs, the wear surface is isolated between the inner and outer race of the ball bushings which are designed to accommodate such wear. When the wear becomes significant, it is only necessary to replace the ball bushing rather than the pin itself. Such a design is more economical to use, however a very high pre-load torque is usually necessary to fix the ball bushing relative to the pivot pin. Even when a high pre-load torque is applied, a clearance fit normally occurs between pivot pin and the housing which allows motion due to the oscillating cylinder forces. This motion tends to wear the housing thereby relaxing the pre-load and in turn allowing the ball bushing to turn even more relative to the pivot pin. Such motion reduces the life expectancy of the parts.

Now a pivot pin assembly has been invented which transfers substantially all of the wear between the inner and outer races of the ball bushing and which uses a compression spring such that the required high pre-load torque necessary to fix the ball bushing relative to the pivot pin is eliminated.

SUMMARY OF THE INVENTION

Briefly, the present invention relates to a pivot pin assembly which is designed to transfer essentially all wear between the various components to the surface between the inner and outer races of the ball bushing. In addition, a compression spring is so placed within the assembly such that it is no longer necessary to apply a high pre-load torque to the assembly in order to fix the ball bushing relative to the pivot pin.

The general object of this invention is to provide a pivot pin assembly for connecting two angularly movable members together. A more specific object of this invention is to provide a pivot pin assembly which reduces the high pre-load torque necessary to fix a ball bushing relative to a pivot pin.

Another object of this invention is to provide a pivot pin assembly which provides a uniform pre-load to the ball bushing.

Still another object of this invention is to provide a pivot pin assembly which compensates for variations and tolerances between the various components of the assembly without requiring a high pre-load torque to be applied in order to fix the ball bushing relative to the pivot pin.

A further object of this invention is to provide a pivot pin assembly which is easy to disassemble and reassemble.

Other objects and advantages of the present invention will become more apparent to those skilled in the art in view of the following description and the accompanying drawing.

DETAILED DESCRIPTION OF THE PREFERRED EMBODIMENTS

Figure 1:
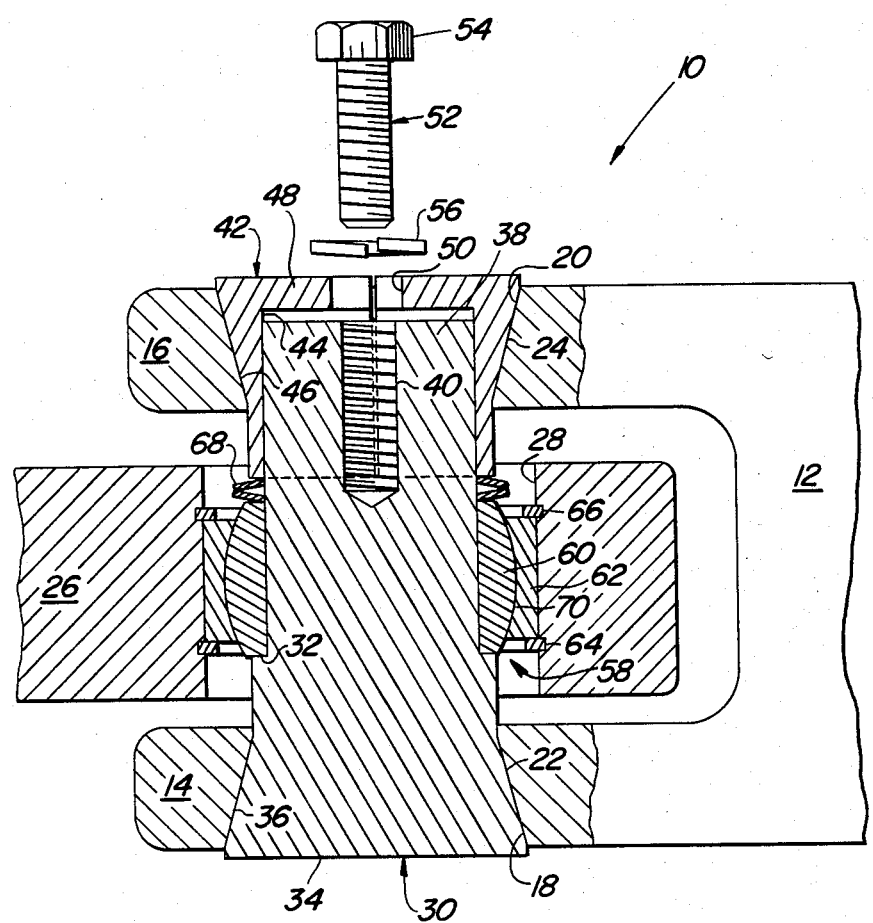
FIG. 1 is a longitudinal cross-sectional view of the pivot pin assembly.

Referring to FIG. 1, a pivot pin assembly 10 is depicted showing a bifurcated member 12 having a pair of arms 14 and 16. Each of the arms 14 and 16 has a bore 18 and 20 respectively, formed therethrough. Each of the bores 18 and 20 have a conical surface 22 and 24 respectively, which tapers outwards towards the outer surface of each of the arms 14 and 16. An intermediate member 26, such as a hydraulic cylinder rod, is located between the arms 14 and 16. The intermediate member 26 has a bore 28 formed therethrough which is concentrically aligned with the bores 18 and 20 of the arms 14 and 16, respectively. A pivot pin 30 is receivable in the bores 18, 20 and 28 and has a generally cylindrical center portion having a step or shoulder 32 formed thereon. Preferably, the step 32 is located within the confines of the bore 28 of the intermediate member 26. The pivot pin 30 has a first end 34 which contains an inwardly tapering surface 36 which is mateable with the conical surface 22 of the arm 14. The pivot pin 30 also has a generally cylindrical second end 38 which is freely received within the bore 24 of the arm 16. Axially disposed in the second end 38 is a threaded bore 40, the purpose of which will be explained shortly.

A split cup-shaped collet 42 is designed to be received in the bore 20 of the arm 16 and to engage with the second end 38 of the pivot pin 30. The split collet 42 has an internal diameter 44 which is approximately equal to the external diameter of the second end 38 of the pivot pin 30. The split collet 42 also has an inwardly tapering external surface 46 which is mateable with the conical surface 24 of the bore 20. The split collet 42 further has an end wall 48 with an opening 50 formed therethrough which is concentrically aligned with the threaded bore 40 formed in the pivot pin 30. The split collet 42 is designed to be permanently attached to the pivot pin 30 via a threaded bolt 52 having an enlarged head 54. In order to assure that the bolt 52 remains in engagement with the threaded bore 40, a lock washer 56 can be used.

The pivot pin assembly 10 also includes a friction-reducing element 58 such as a ball bushing or a spherical bearing which contains an inner race 60 and an outer race 62. Preferably, the friction-reducing element 58 is a spherical bearing, in which the spheres are constructed on the inner race 60 rather than on the outer race 62. As shown in FIG. 1, the outer race 62 is press-fitted into the bore 28 of the intermediate member 26 and is held in position by a pair of snap rings 64 and 66. It should also be noted that the friction-reducing element 58 is slidably positioned about the periphery of the center portion of the pivot pin 30 such that one side or end will abut and contact the step 32.

A novel feature of the pivot pin assembly 10 is that it employs a spring 68 positioned about the periphery of the pivot pin 30 between the friction-reducing element 58 and the collet 42. The spring 68, which is preferably one or more Belleville springs, is designed to exert a desired pre-load on the friction-reducing element 58 once the spring 68 is compressed a predetermined amount. The use of a pair of Belleville springs is desired because it permits a rather thin wall collet 42 to be used. When one Belleville spring is used, the collet 42 and/or the top surface of the friction-reducing element 58 may have to be enlarged or alternatively, washers may have to be inserted therebetween such that sufficient contact is made with the ends of the springs 68. The spring 68 is compressed as the bolt 52 is threaded into the bore 40 of the pivot pin 30. In so doing, the split collet 42 is drawn into engagement with the pivot pin 30 and the conical surfaces 22 and 24 will mate with the conical surfaces 36 and 46 of the pivot pin 30 and collet 42 respectively. It is generally acceptable that cone seats are widely used for joints requiring accurate positioning and tight fits. Small variations in the cone diameters can create large variations in the cone position due to the cones shape. The distance between two cones facing each other, fitted tightly in their respective seats, is dependent on these variations. The use of opposite facing cone surfaces in conjunction with the compressible spring 68 permits one to obtain a desired pre-load on the inner race 60 of the spherical bearing 58 regardless of the variable distance which exists between the lower end of the collet 42 and the adjacent surface of the friction-reducing element 58.

It should be noted that this design permits the use of relatively low pre-load torque on the bolt 52 in order to fix the inner race 60 of the friction-reducing element 58 to the pivot pin 30. The spring 68, being a flexural member with a non-linear spring rate, substantially reduces the spring rate of the assembly. Regardless of the type of spring which is used in the pivot pin assembly 10, it should be noted that under no circumstances should the spring 68 be allowed to be compressed fully. If this occurs, a mechanical link is formed between the pivot pin 30 and the collet 42 which nullifies the function of the spring. It should be further indicated that in normal operations, the press fit of the outer race 62 of the friction-reducing element 58 to the bore 28 of the intermediate member 26, along with the use of the snap rings 64 and 66, will hold the outer race 62 stationary thereby preventing rotation. With the spring 68 axially forcing the friction-reducing member 58 against the shoulder 32, essentially all wear which will occur to the assembly 10, due to the pivotal motion, will occur at a surface 70 which is located between the inner and outer races 60 and 62, respectively.

Figure 2:
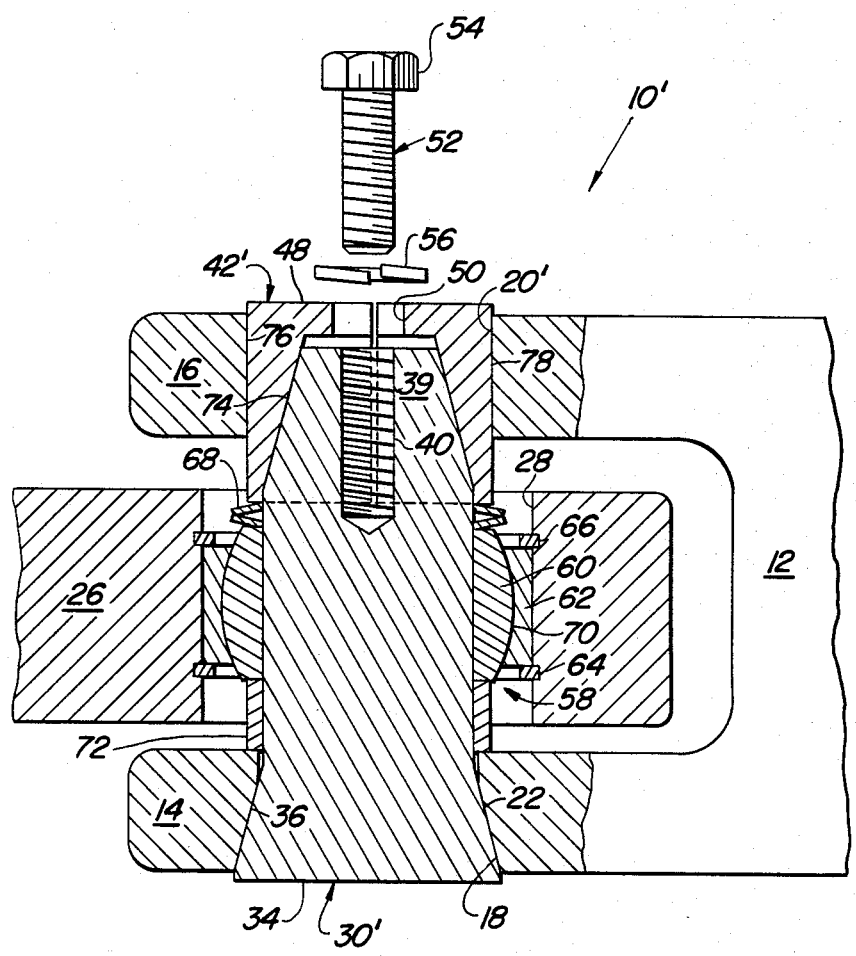
FIG. 2 is a longitudinal cross-sectional view of an alternative pivot pin assembly.

Referring now to FIG. 2, an alternative pivot pin assembly 10' is shown. For purposes of convenience and not by way of limitation, similar parts have been designated by the same numerals as used in FIG. 1. In the pivot pin assembly 10', a pivot pin 30' is used which does not contain a stepped central portion but which contains a conically formed second end 39. In place of the step, a sleeve 72 is positioned about the periphery of the central portion of the pivot pin 30' between the arm 14 and the friction-reducing element 58. The sleeve 72 is of sufficient diameter so as to abut the inner surface of the arm 14 thereby forming a non-axially movable stop for the friction-reducing element 58.

The alternative pivot pin assembly 10' also incorporates a split cup-shaped collet 42' which has a conical, inwardly tapering interior surface 74 and a generally cylindrical exterior surface 76. The exterior surface 76 mates with a generally cylindrical surface 78 of a bore 20' formed in the arm 16 while the conical interior surface 74 mates with the conical second end 39 of the pivot pin 30'. As the split collet 42' is drawn onto the pivot pin 30' by means of a bolt 52, the surfaces 74 and 76 form a wedge joint with the second end 39 of the pivot pin 30' and with the surface 78 of the bore 20', respectively. As the split collet 42' is drawn onto the pivot pin 30', the spring 68 is compressed a predetermined amount such that a desired preload is obtained on the friction-reducing element 58 which will compensate for variations and tolerances between the various components of the assembly.

While the invention has been described in conjunction with two specific embodiments, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:

1. A pivot pin assembly comprising:
   (a) a bifurcated member having a pair of arms, each arm having a bore formed therethrough, one of said bores having an outwardly progressing conical surface;
   (b) an intermediate member located between said pair of arms and having a bore formed therethrough which is concentrically aligned with said bores formed in said arms;
   (c) a pivot pin received in said bores and having a generally cylindrical center portion fitted within said bore of said intermediate member, said pivot pin having a first end mateable with said bore having said conical surface and having a second end freely received in said bore of said other arm;
   (d) a split cup-shaped collet having a tapered surface which is positioned between said second end of said pivot pin and said bore formed in said adjacent arm when said collet is inserted over said second end of said pivot pin to form a wedge joint;
   (e) a friction-reducing element encircling said center portion of said pivot pin and abutting a non-axially movable stop at one end, said friction-reducing element having an outer race fixed to the interior surface of said bore formed in said intermediate member;
   (f) a spring positioned about the periphery of said pivot pin between said friction-reducing element and said collet for exerting a desired pre-load on said friction-reducing element once said spring is compressed a predetermined amount; and
   (g) means for axially drawing said pivot pin and said collet together so as to wedge said first end of said pivot pin into said conical bore and to wedge said second end of said pivot pin, said collet and said bore of said other arm together, thereby compressing said spring such that a desired pre-load is obtained on said friction-reducing element which compensates for variations in tolerances between various components of said assembly.

2. The pivot pin assembly of claim 1 wherein said non-axially movable stop is a sleeve positioned about the periphery of said pivot pin between one of said arms and said friction-reducing element.

3. The pivot pin assembly of claim 2 wherein said sleeve has an outside diameter which is larger than the smaller diameter of said conical bore.

4. The pivot pin assembly of claim 1 wherein said friction-reducing element is a ball bushing.

5. The pivot pin assembly of claim 1 wherein said friction-reducing element is a spherical bearing.

6. The pivot pin assembly of claim 1 wherein said spring means is a Belleville spring.

7. The pivot pin assembly of claim 1 wherein said spring means is a pair of Belleville springs.

8. The pivot pin assembly of claim 1 wherein said spring means exerts a sufficient force on an inner race of said friction-reducing element to prevent rotation of said inner race relative to said pivot pin.

9. A pivot pin assembly comprising:
   (a) a bifurcated member having a pair of arms, each arm having a bore formed therethrough which has an outwardly progressing conical surface;
   (b) an intermediate member located between said pair of arms and having a bore formed therethrough which is concentrically aligned with said bores formed in said arms;
   (c) a pivot pin received in said bores and having a generally cylindrical stepped center portion fitted within said bore of said intermediate member and having a first end mateable with one of said conical surfaces formed in said arms and having a second generally cylindrical end freely received in said bore of said other arm;
   (d) a split cup-shaped collet having an internal diameter approximately equal to the exterior diameter of said second cylindrical end of said pivot pin and having a conical surface on an exterior portion thereof which is tapered to engage with said conical surface of said bore of said other arm;
   (e) a friction reducing element encircling said center portion of said pivot pin and abutting said step formed thereon, said friction reducing element having an outer race fixed to the interior surface of said bore formed in said intermediate member;
   (f) a spring positioned about the periphery of said pivot pin between said friction reducing element and said collet for exerting a desired pre-load on said friction reducing element once said spring is compressed a predetermined amount; and
   (g) means for axially drawing said pivot pin and said collet together so as to wedge both said first end of said pivot pin and said collet onto said conical surfaces of said respective arms, thereby compressing said spring such that a desired pre-load is obtained on said friction reducing element which compensates for variations in tolerances between various components of said assembly.

10. A pivot pin assembly comprising:
   (a) a bifurcated member having a pair of arms, each arm having a bore formed therethrough which has an outwardly progressing conical surface;
   (b) an intermediate member located between said pair of arms and having a bore formed therethrough which is concentrically aligned with said bores formed in said arms;
   (c) a pivot pin received in said bores and having a generally cylindrical stepped center portion fitted within said bore of said intermediate member and having a first end mateable with one of said conical surfaces formed in said arms and having a second generally cylindrical end freely received in said bore of said other arm, said second end having an axially disposed threaded bore formed therein;
   (d) a split cup-shaped collet having an internal diameter approximately equal to the exterior diameter of said second cylindrical end of said pivot pin and having a conical surface on an exterior portion thereof which is tapered to engage with said conical surface of said bore of said other arm, said collet further having an end wall with an opening formed therethrough which is concentrically aligned with said threaded bore formed in said pivot pin;
   (e) a friction reducing element encircling said center portion of said pivot pin and abutting said step formed thereon, said element having an outer race fixed to an interior surface of said bore formed in said intermediate member;
   (f) a spring positioned about the periphery of said pivot pin between said friction-reducing element and said collet for exerting a desired pre-load on said friction-reducing element once said spring is compressed a predetermined amount; and
   (g) a bolt passing through said opening in said end wall of said collet and engageable in said threaded bore formed in said pivot pin, said bolt having a head thereon which contacts said end wall of said collet as said bolt is tightened so as to wedge both said first end of said pivot pin and said collet onto said conical surfaces of said respective arms, thereby compressing said spring such that a desired pre-load is obtained on said friction reducing element which compensates for variations in tolerances between the various components of said assembly.

11. The pivot pin assembly of claim 10 wherein said spring is a pair of Belleville springs which exerts a sufficient force on an inner race of said friction-reducing element to prevent rotation of said inner race relative to said pivot pin.

12. A pivot pin assembly comprising:
   (a) a bifurcated member having a pair of arms, each arm having a bore formed therethrough, one of said bores having an outwardly progressing conical surface;
   (b) an intermediate member located between said pair of arms and having a bore formed therethrough which is concentrically aligned with said bores formed in said arms;
   (c) a pivot pin received in said bores and having a generally cylindrical center portion fitted within said bore of said intermediate member, said pivot pin having a conical first end mateable with said bore having said conical surface and having a conical second end freely received in said bore of said other arm;
   (d) a split cup-shaped collet having a conical interior surface mateable with said second end of said pivot pin and having a generally cylindrical exterior surface mateable in said bore of said other arm;
   (e) a sleeve positioned about the periphery of said pivot pin and positioned adjacent to an inner surface of said arm containing said bore with said conical surface, said sleeve having an outside diameter which is larger than the smaller diameter of said conical bore;
   (f) a friction-reducing element encircling said center portion of said pivot pin and abutting said sleeve, said friction-reducing element having an outer race fixed to the interior surface of said bore formed in said intermediate member;

(g) a spring positioned about the periphery of said pivot pin between said friction-reducing element and said collet for exerting a desired pre-load on said friction-reducing element once said spring is compressed a predetermined amount; and (h) means for axially drawing said pivot pin and said collet together so as to wedge said first end of said pivot pin to said bore with said conical surfaces and to wedge said collet onto said second end of said pivot pin and into said bore of said other arm, thereby compressing said spring such that a desired pre-load is obtained on said friction-reducing element which compensates for variations in tolerances between various components of said assembly.

13. The pivot pin assembly of claim 12 wherein said friction-reducing element is a ball bushing.

14. The pivot pin assembly of claim 12 wherein said firction-reducing element is a spherical bearing.

15. The pivot pin assembly of claim 12 wherein said spring is a Belleville spring.

16. The pivot pin assembly of claim 12 wherein said spring is a pair of Belleville springs.

17. The pivot pin assembly of claim 12 wherein said spring exerts a sufficient force on an inner race of said friction-reducing element to prevent rotation of said inner race relative to said pivot pin.

18. A pivot pin assembly comprising:

(a) a bifurcated member having a pair of arms, each arm having a bore formed therethrough with one of said bores having an outwardly progressing conical surface;

(b) an intermediate member located between said pair of arms having a bore formed therethrough which is concentrically aligned with said bores formed in said arms;

(c) a pivot pin receivable in said bores having a generally cylindrical center portion and having a first end mateable with said bore having said conical surface and having a second conical end freely received in said bore of said other arm, said second end having an axially disposed threaded bore formed therein;

(d) a split, cup-shaped collet having a conical interior surface mateable with said second end of said pivot pin, a cylindrical exterior surface of approximately the same diameter as the interior surface of said bore formed in said arm adjacent to said second end of said pivot pin, and an end wall partially fitted within said bore of said respective arm, said end wall having an opening formed therethrough which is concentrically aligned with said threaded bore formed in said pivot pin;

(e) a sleeve positioned about the periphery of said pivot pin between said pair of arms, said sleeve having an outer diameter which is larger than the inner diameter of said bore having said conical surface;

(f) a friction-reducing element encircling said center portion of said pivot pin and abutting an end of said sleeve, said element having an outer race fixed to an interior surface of said bore formed in said intermediate member;

(g) a spring positioned about the periphery of said pivot pin between said friction-reducing element and said collet for exerting a desired preload on said friction-reducing element once said spring is compressed a predetermined amount; and (h) a bolt passing through said opening in said end wall of said collet and engageable in said threaded bore formed in said pivot pin, said bolt having a head thereon which contacts said end wall of said collet as said bolt is tightened so as to wedge said first end of said pivot pin into said conical bore and to wedge said second end of said pivot pin into said collet, thereby compressing said spring such that a desired preload is obtained on said friction-reducing element which compensates for variations in tolerances between the various components of said assembly.

* * * * *